(12) United States Patent
Kluka et al.

(10) Patent No.: US 8,554,437 B2
(45) Date of Patent: Oct. 8, 2013

(54) ELECTRONIC PASSCODE KEY FOR VARYING OPERATIONAL PARAMETERS OF A VEHICLE

(75) Inventors: Robert J. Kluka, Evans, GA (US); John Lewis Lawson, Evans, GA (US); Gary D. Johnson, Martinez, GA (US); Kelly J. White, Nicholasville, KY (US); Tonya L. White, legal representative, Nicholasville, KY (US)

(73) Assignee: Textron Inc., Providence, RI (US)

( * ) Notice: Subject to any disclaimer, the term of this patent is extended or adjusted under 35 U.S.C. 154(b) by 64 days.

(21) Appl. No.: 13/032,862

(22) Filed: Feb. 23, 2011

(65) Prior Publication Data

US 2012/0215413 A1 Aug. 23, 2012

(51) Int. Cl.
*B60R 25/00* (2013.01)
*B60R 16/02* (2006.01)

(52) U.S. Cl.
USPC .................................. 701/70; 180/178

(58) Field of Classification Search
USPC .................................. 701/70; 180/178, 179
See application file for complete search history.

(56) References Cited

U.S. PATENT DOCUMENTS

| | | | | |
|---|---|---|---|---|
| 5,033,000 A * | 7/1991 | Littlejohn et al. | | 701/36 |
| 5,838,251 A * | 11/1998 | Brinkmeyer et al. | | 340/5.22 |
| 6,253,143 B1 * | 6/2001 | Silvernagle et al. | | 701/93 |
| 6,700,220 B2 * | 3/2004 | Bayeur et al. | | 307/10.2 |
| 6,871,132 B2 * | 3/2005 | Olsen et al. | | 701/93 |
| 6,873,061 B2 * | 3/2005 | Kaltenbrunner et al. | | 307/10.2 |
| 7,184,873 B1 * | 2/2007 | Idsinga et al. | | 701/93 |
| 7,626,494 B2 * | 12/2009 | Yamamoto et al. | | 340/441 |
| 7,822,514 B1 * | 10/2010 | Erickson | | 701/2 |
| 8,219,270 B2 * | 7/2012 | Lenart et al. | | 701/22 |
| 2002/0170762 A1 * | 11/2002 | Daneshmand | | 180/178 |
| 2004/0046686 A1 * | 3/2004 | Kerlin et al. | | 341/176 |
| 2009/0309696 A1 * | 12/2009 | Tsuruta et al. | | 340/5.22 |
| 2011/0257810 A1 * | 10/2011 | Leger | | 701/1 |

FOREIGN PATENT DOCUMENTS

| | | | | |
|---|---|---|---|---|
| DE | 3220083 A1 * | 12/1983 | | B60K 31/00 |
| DE | 3906887 A1 * | 9/1990 | | E05B 47/00 |
| DE | 102005000615 A1 * | 7/2006 | | |
| EP | 624488 A1 * | 11/1994 | | B60K 31/00 |
| GB | 2434880 A * | 8/2007 | | |

OTHER PUBLICATIONS

EPO Machine Translation of DE 3220083.*
Derwent English abstract for DE 102005000615.*
EPO Machine Translation of DE 3220083 (original DE document published Dec. 1, 1983).*
Derwent English abstract for DE 102005000615 (original DE document published Jul. 20, 2006).*

* cited by examiner

*Primary Examiner* — James Trammell
*Assistant Examiner* — David Testardi
(74) *Attorney, Agent, or Firm* — Harness, Dickey & Pierce, P.L.C.

(57) ABSTRACT

An electronic passkey system enables modification of operating profiles of a vehicle. When the passkey is connected to the vehicle controller, the system determines if the passkey has been used previously. If so, the operating profile cannot be modified. If not, the vehicle profile can be modified. In other configurations the passkey can be used to modify the operating profile of multiple vehicles.

17 Claims, 4 Drawing Sheets

|  |  | Current Vehicle State | Changed Vehicle State | Vehicle Response |
|---|---|---|---|---|
| Case I | Profile | 1 - 4 | 5 | 1 set of 3 beeps at 2 Hz |
|  | Enable Mode N | OFF | ON |  |
|  | Passkey State | New | Used |  |
| Case II | Profile | 1 - 4 | Unchanged | 1 continuous beep for 2 seconds |
|  | Enable Mode N | OFF | OFF |  |
|  | Passkey State | Used | Still Used |  |
| Case III | Profile | 5 | 5 | 1 set of 6 beeps at 4 Hz |
|  | Enable Mode N | ON | ON |  |
|  | Passkey State | New | Still New |  |
| Case IV | Profile | 5 | 5 | 1 continuous beep for 2 seconds |
|  | Enable Mode N | ON | ON |  |
|  | Passkey State | Used | Still Used |  |
| Case V | Profile | 1 - 4 | 5 | 1 set of 3 beeps at 2 Hz |
|  | Enable Mode N | ON | ON |  |
|  | Passkey State | New | Used |  |
| Case VI | Profile | 1 - 4 | Unchanged | 1 continuous beep for 2 seconds |
|  | Enable Mode N | ON | ON |  |
|  | Passkey State | Used | Still Used |  |

Fig. 4

ELECTRONIC PASSCODE KEY FOR VARYING OPERATIONAL PARAMETERS OF A VEHICLE

FIELD

The present disclosure relates to controlling a vehicle and to an electronic key for varying operational parameters of a vehicle.

BACKGROUND

This section provides background information related to the present disclosure which is not necessarily prior art.

Golf cars or small utility vehicles have progressively filled a larger niche in meeting various customer demands. Golf car or small utility vehicle customers include both golf courses and individuals. Golf courses typically prefer a configuration for a golf car which may include limiting the forward/reverse speeds, acceleration, deceleration, and braking profiles of the golf car or small utility vehicle in order to make the golf car or small utility vehicle to be suitable for operation on all areas of the golf course. Some individual owners may have similar needs and desire similar forward/reverse speeds, acceleration, deceleration, and braking profiles. Other individual owners, however, may envision a different use for a golf car or small utility vehicle. These uses may favor different operating profiles. For example, airports comprise yet another possible user of golf cars or small utility vehicles and may have yet other, different preferred operating profiles.

A typical airport configuration may desire slower top speeds in both the forward and reverse directions, less steep acceleration profiles, and more steep deceleration profiles. Even within the golf course community, different courses may well require different configurations. For example, a coastal golf course, quite often less hilly, may allow higher top vehicle speeds, steeper acceleration profiles, and less steep deceleration profiles. Golf courses considered mildly hilly, on the other hand, may prefer lower top speeds, less steep acceleration profiles, and more steep deceleration profiles. Further yet, golf courses with taller or steeper hills may prefer yet slower top speeds, approximately the same acceleration profile as mildly hilly golf courses, and steeper deceleration profiles. Individual customers, on the other hand, may desire higher top speeds, steeper acceleration profiles, and less steep deceleration profiles than either an airport or golf course.

The various forward speed, reverse speed, acceleration, deceleration, and braking profiles or parameters can be grouped to define various modes of operation. Various parameters or modes can be made available to the end user for selective use, whether airport, golf course, or individual. In some applications, however, the golf car or small utility vehicle manufacturer may desire to restrict access to various parameters or modes of operation. Such restrictions are typically implemented through software which limits access and modification to various parameters or mode selection.

Golf car and light utility vehicle applications often provide a mix of access to the available parameters or modes. In a typical light utility vehicle application, restricted modes cannot be accessed by end users. Access can be limited to dealers and, in some circumstances, golf course operators. A typical approach to enabling access to restricted parameters involves utilizing a handheld device which is connected to a diagnostic or other electronic access port on the golf car or light utility vehicle. The technician typically enters an access code to allow modifying various portions of the software stored in memory. Once the access code is entered, the technician can then use the handheld device in order to grant access to the various parameters or modes.

While this approach may be suitable in some applications, there are instances when it is desirable to simply enable the end user, such as an individual, to make limited changes to the software or vehicle operating profile without the need for a hand held programming device typically used by golf car dealers or golf course operators. For example, a user that acquires a golf car from a golf course or airport may desire to change the mode to a setting more appropriate for individual owners. A desired profile might include higher forward speeds, steeper acceleration profiles, and shallower deceleration profiles. In such instances, requiring the end user of a newly acquired golf car to take the golf car to a dealer for changes may be avoidable if the change could be enabled in a controlled manner. Similarly, golf car and light utility vehicle dealers may prefer to enable less skilled individuals to effect changes to the software while limiting the kinds of changes.

SUMMARY

This section provides a general summary of the disclosure, and is not a comprehensive disclosure of its full scope or all of its features.

A vehicle control system, including a control module. The control module controls a vehicle in accordance with at least one parameter of vehicle operation. An external port provides electrical communication between the control module and an external device. A parameter control device is selectively connected to the external port to enable electrical communication between the controller and the parameter control device. The parameter control device and control module cooperate to modify the at least one parameter. The parameter control device has a predetermined limitation encoded therein of the number of controllers of which it can modify the at least one parameter. The parameter control device and control module cooperate to modify the at least one parameter upon connection to the external port when the vehicle control module is in a predetermined mode.

A parameter key includes memory for storing data. The parameter key also includes an interface to a vehicle controller. The parameter key communicates the data stored in memory to the vehicle controller upon electrical communication between the parameter key and the vehicle controller. The memory stores vehicle identifier information associated with the vehicle and the vehicle controller modifies a vehicle parameter in accordance with the vehicle identifier information. The key has a predetermined limitation encoded therein on the number of controllers of which it can modify the control parameter.

A parameter key for a vehicle. The vehicle has a prime mover causing displacement of the vehicle when actuated. The vehicle also has a braking system to reduce the speed of the vehicle when actuated. A control module controls at least one parameter of the prime mover or the braking system. The vehicle also has an external port providing electrical communication with the control module. A parameter key port is selectively connected to the external port to enable electrical communication between the parameter key and the control module. Memory stores information wherein the parameter key cooperates with the control module to modify the at least one parameter. The parameter key enables a predetermined modification of the at least one parameter. Wherein the parameter key communicates with the controller to enable the predetermined modification upon connection to the external port when the vehicle control module is in a predetermined mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a table providing example modes of operation of a golf car or utility vehicle.

Corresponding reference numerals indicate corresponding parts throughout the several views of the drawings.

DETAILED DESCRIPTION

Figure 1:
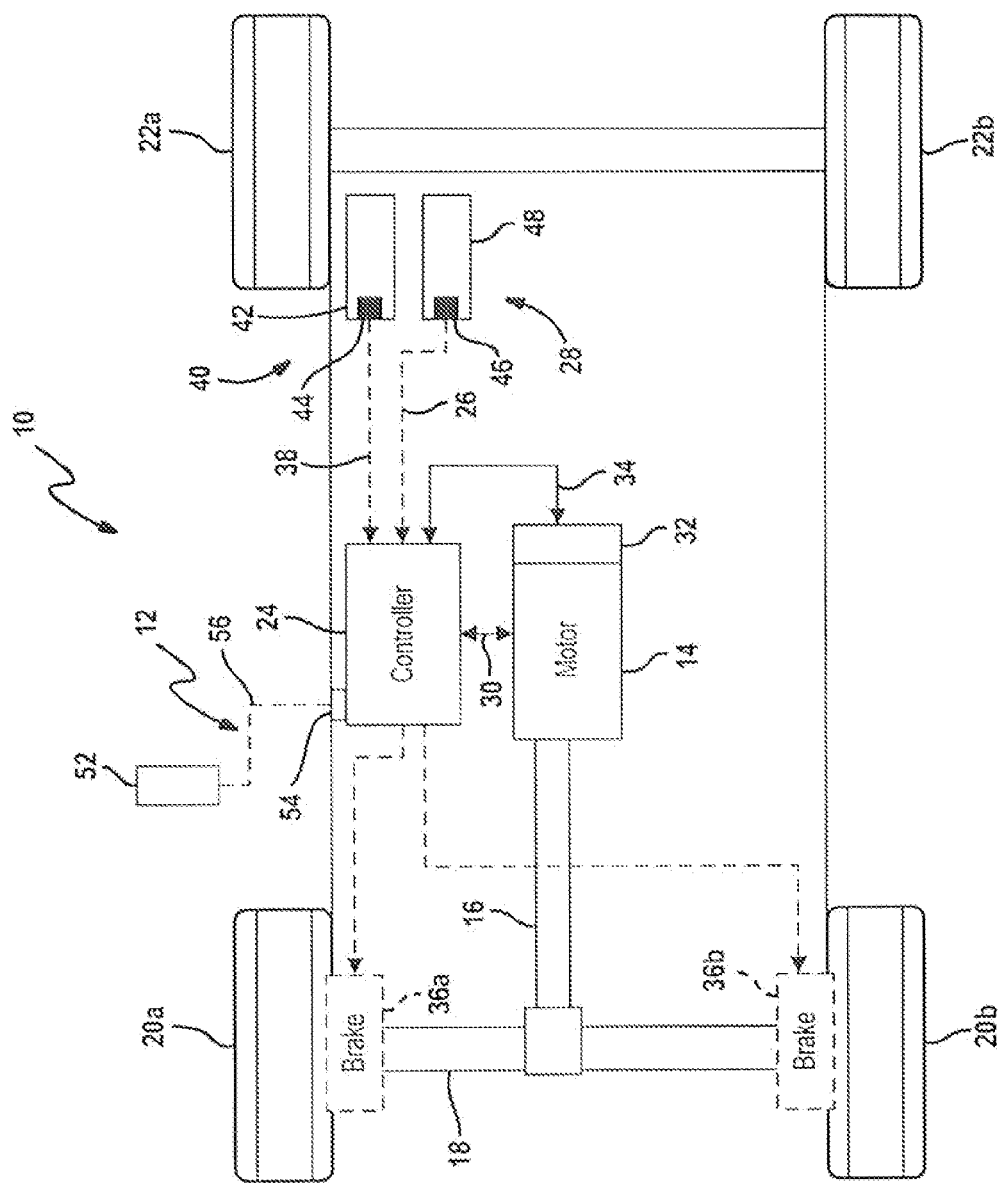
FIG. 1 is a functional block diagram of a golf car or light utility vehicle.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 is a functional block diagram illustrating components of an exemplary light utility vehicle or golf car 10 including an electronic passkey system 12, in accordance with various embodiments. A motor 14 or engine is coupled to a drive shaft 16. Drive shaft 16 transfers torque from motor 14 to a rear axle 18 and rear wheels 20*a* and 20*b*. A transmission (not shown) may be coupled between motor 14 and drive shaft 16 in order to transfer different levels of torque to rear wheels 20*a* and 20*b*. Alternatively, a transaxle may be mounted to motor 14 and to two separate axles (not shown) to transfer different levels of torque to rear wheels 20*a* and 20*b*. Alternatively, according to various embodiments, any of the above-described drive configurations can be used to transfer torque to front wheels 22*a*, 22*b*. According to various other embodiments, light utility vehicles or golf car 10 may be front wheel drive, rear wheel drive, or various combinations thereof. According to various embodiments, motor 14 may be any of any electrically driven motor, such as an AC drive motor, a DC drive motor, a brushed motor, a brushless motor, or various combinations thereof. Further yet, an engine (now shown) may be substituted for motor without varying the principles described herein.

Controller 24 generates an electronic control signal 30 applied to motor 14 in order to vary the speed and torque output of motor 14. In various embodiments, controller 24 modulates electrical energy received from an electrical energy source (not shown), such as stored electrical energy or a motor generator set, to motor 14. By modulating the electrical energy applied to motor, controller 24 can control the output of motor in accordance with various conditions. Controller 24 controls motor 14 based on an accelerator signal 26 received from an accelerator pedal assembly 28. Accelerator pedal assembly 28 includes an accelerator pedal position sensor 46 and an accelerator pedal 48. Accelerator pedal position sensor 46 generates accelerator signal 26 based on a sensed position of accelerator pedal 48. In various embodiments, mechanical linkages may be used to connect the accelerator to a motor or engine to enable control of the motor or engine or brake pedals to the brake mechanism.

Motor 14 has attached thereto an electromechanical brake 32 which is responsive to a brake control signal 34. Electromechanical brake 32 provides a braking function to motor 14, and consequently light golf car utility vehicle 10, in accordance with brake control signal 34. In various embodiments, the brake function, rather than being implemented by electromechanical brake 32 attached to motor 14, can be implemented by electromechanical brakes 36a, 36b (shown in phantom) mounted to rear wheels 20a, 20b respectively. Controller 24 controls electromechanical brake 32 (or 36a and 36b) based on a brake signal 38 received from a brake pedal assembly 40. Brake pedal assembly 40 includes a brake pedal 42 and a brake pedal position sensor 44. Brake pedal position sensor 44 generates brake signal 38 based on a sensed position of brake pedal 42. In various embodiments, controller 24 can also provide a braking function to motor 14 using regenerative or plug braking as primary or assist braking. In various embodiments, brakes 36a, 36b are implemented as mechanically or hydraulically actuated brakes controlled by mechanical or hydraulic linkage with brake pedal assembly 40.

As can be appreciated, controller 24 may be any known microprocessor or controller known in the art. In an exemplary embodiment, controller 24 is a microprocessor having read only memory (ROM), random access memory (RAM), and a central processing unit (CPU). Controller 24 may include any number of control modules or circuitry that provide the functionality for controlling motor 14, electromechanical brakes 32 (or 36a and 36b) of golf car or utility vehicle 10. In various other embodiments, controller 24 is an application specific integrated circuit (ASIC), an electronic circuit, a combinational logic circuit and/or other suitable components that provide the control functionality as described below.

Electronic passkey system 12 includes an electronic passkey 52 which interfaces with controller 24 via port 54 associated with controller 24. In various embodiments, port 54 is an external port, such as a diagnostic port, which includes a connector and pins which electrically communicate with controller 24 to provide electrical communication between controller 24 and an external device, such as passkey 52. Passkey 52 communicates with external port 54 via a communications link 56. In various embodiments, communications link 56 may simply comprise the pins of external port 54. In various other embodiments, communications link 56 may include one or plurality of electrical conductors selectively disconnectable from one or both of external port 54 or electronic passkey 52.

Figure 2:
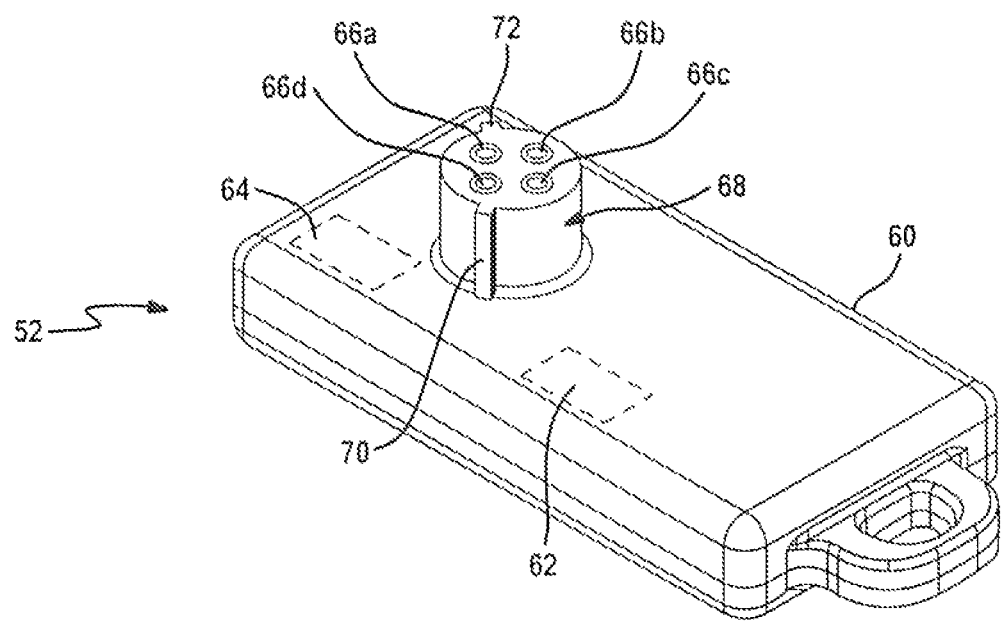
FIG. 2 is a perspective view of an electronic passcode key arranged in accordance with the principles of the disclosure.

FIG. 2 shows passkey 52 according to various embodiments. Passkey 52 includes an external case 60 which houses various electronic components. In various embodiments, the electrical components include memory 62 which may be, by way of non-limiting example, nonvolatile memory RAM, ROM, flash memory, or other electronically programmed memory to which data may be written. In various embodiments, passkey 52 may include a processor or controller 64 implemented in any of a number of known configurations for processors. Electrical connection to external port 54 occurs through one or a plurality of pins 66a, 66b, 66c, and 66d, collectively referred to as pins 66. Pins 66 enable electrical communication between memory 62 or controller 64 and controller 24. By way of non-limiting example, the pins may provide various functions, including data transmit, data receive, power, and ground.

Physical interconnection between passkey 52 and external port 54 occurs through connector 68. Connector 68 includes one or a plurality of alignment keys 70, 72. External port 54, includes a complementary connector. By way of non-limiting example, external port 54 may include a shape accommodating keys 70, 72 so that electronic passkey 52 can connect to controller 24 in a single orientation.

Figure 3:
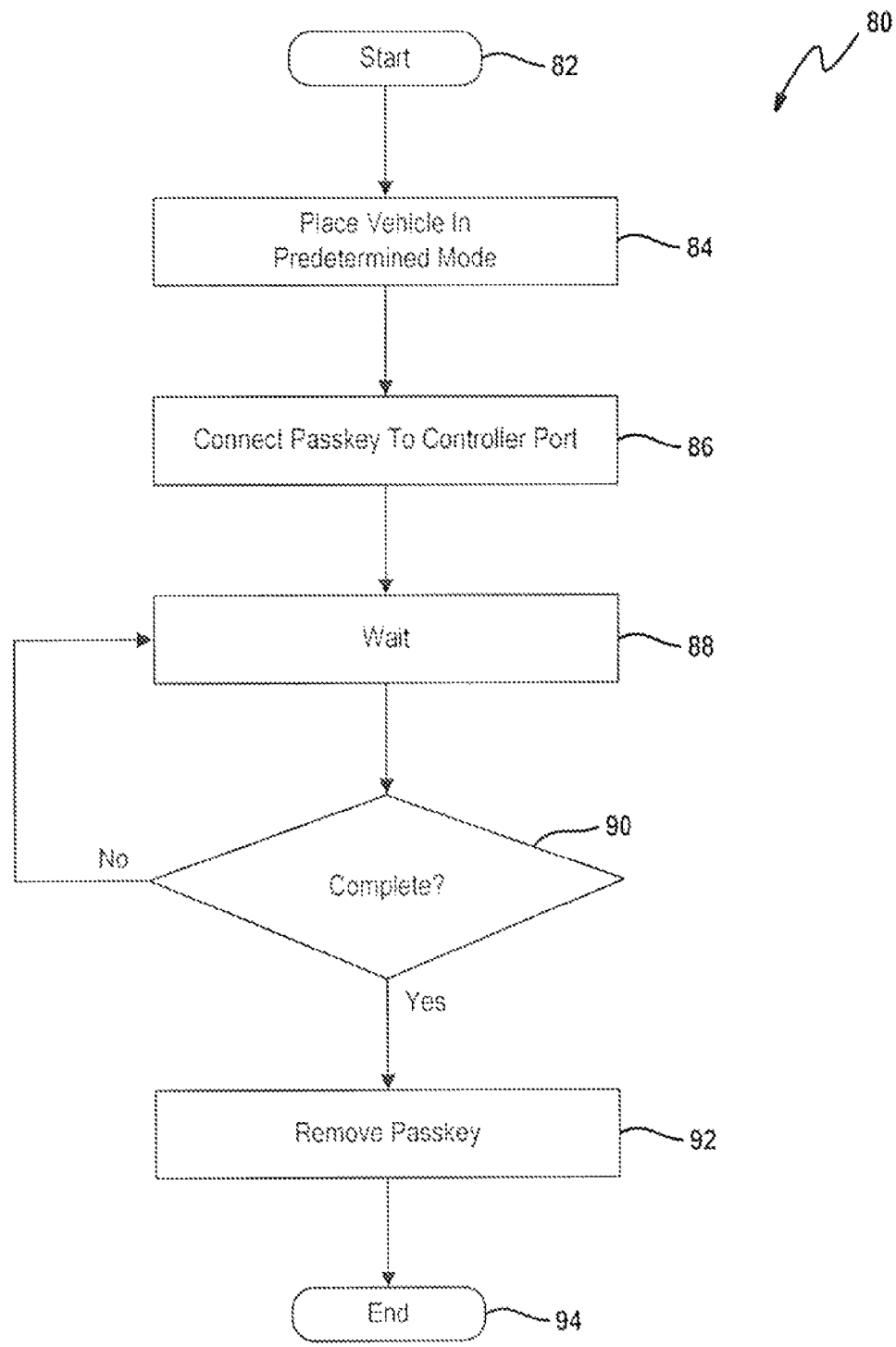
FIG. 3 is a flow diagram for using the electronic passcode key.

FIG. 3 depicts a flow diagram 80 describing operation of electronic passkey 52. Control begins at the start block 82 and proceeds to block 84. Block 84 places golf car or light utility vehicle 10 in a predetermined state of operation in anticipation of interconnection between controller 24 and passkey 52. For example, the vehicle 10 may be placed in a predetermined one of a stop mode, a run mode, a tow mode, or other appropriate mode for utilizing passkey 52. Once the vehicle is placed in a predetermined mode, control proceeds to block 86 where passkey 52 is connected to controller 24 via external port 54, as described above. Once connected, control proceeds to block 88 which waits for an indication that operation of the vehicle has been modified. Operation of the vehicle is modified by modifying at least one or more parameters or groups of parameters that define modes of operation. The parameters that could be modified include one or a number of forward speed, reverse speed, acceleration profile, deceleration profile, braking profile, operational profiles, programming instructions, or other parameters. The changing of parameters or modes may be referred to more generally as modifying the software of controller 24 and can include modifying memory, data maps, range limits, control algorithms, or various combinations thereof. During wait block 88, communication between controller 24 and passkey 52 occurs via a predetermined protocol. A series of steps occurs to verify that the vehicle controller 24 parameters can be properly modified.

Control then proceeds to block 90 which determines whether modification of the software in controller 24 has been completed. If not complete, control proceeds back to block 88 which waits for indication that electronic passkey 52 has modified the parameters of controller 24. Block 90 can determine in various ways whether the software of controller 24 has been modified. Various indicators of completion of the modification operation can include generating audible tones or visual indicators. By way of example, vehicles often include audible alarms to indicate a reverse operation for potential system error conditions. The reverse alarm can also be used to indicate the status of modification of controller 24. In various embodiments, three short audible tones may indicate that a successful modification of controller 24 from a first mode to a second mode.

In various embodiments, passkey 54 may execute program instructions, or may be queried by controller 24, to determine if electronic passkey has previously been connected to a controller 24 and therefore has already modified the software of a controller 24 and cannot be reused. Previous use of passkey 52, in various embodiments may be indicated by setting the value of a predetermined location in memory 62. This can occur in any of blocks 86, 88, and 90 or various combinations thereof. If passkey 54 has previously been connected to controller 24 for a single use or has been used up to a multiple use limit, controller 24 or passkey 52 may initiate an extended audible alarm. In various other configurations, a succession of short audible tones, such as six audible tones, may indicate that controller 24 has already been configured to the predetermined mode and passkey 54 remains unchanged. For example, if passkey 52 is connected to external port 54 in order to place controller 24 in a predetermined mode, if controller 24 is already in the predetermined mode, the passkey will be unused. Upon completion of the operation, control proceeds to block 92 where passkey 52 is removed from external port 54. Control then proceeds to block 94 which ends the process.

In various embodiments, passkey 52 may be configured for one or a number of uses. For example, passkey 52 may only be used one time to modify a controller 24. When passkey 52 is configured so that it may only be used once to modify a controller 24, a location in memory 62 is modified upon the first use by program instructions stored and executed by processor 64 of passkey 52, or by controller 24. In various embodiments, the location in memory 62 may be set or reset to a predetermined value or may be incremented or decremented and disabled upon reaching a predetermined value.

In various embodiments, controller 24 may write the vehicle or controller serial number to memory 62 of passkey 52 or passkey 52 may query controller 24 for a vehicle or controller serial number and store the serial number in memory 62. In various embodiments, passkey 52 may not be used again on any other vehicle, including the vehicle whose serial number is written to memory 62 of passkey 52. In other embodiments, passkey 52 may be used to modify controller 24 of a vehicle having a serial number previously written to memory 62 of passkey 52.

In various other embodiments, passkey 52 can be encoded with a predetermined value or passkey serial number in memory 62. The predetermined value in memory 62 could be output from passkey 52 and stored in memory in controller 24. In this manner, a vehicle can be associated with a predetermined passkey by the passkey serial number which could then only be used with that vehicle. Likewise, in various embodiments, passkey 52 could have a vehicle or controller serial number written into memory 62 or have a memory location set to a predetermined value so that controller 24 and other vehicles could determine whether passkey 52 has already been associated with a predetermined vehicle.

In various embodiments, controller 64 of passkey 52 determines if passkey 52 has been used. Controller 64 can query controller 24 for a vehicle serial number or other identifier and writes the vehicle information to memory 62. In various embodiments, controller 24 queries passkey 52 to determine if it has been used previously. Controller 24 writes the vehicle serial number into memory 62 of passkey 52.

In various other embodiments, electronic passkey 52 may be used multiple times to program a controller 24 of one or multiple vehicles. Previous uses of passkey 52, in various embodiments, may be indicated by setting a predetermined location in memory 62. For example, in various embodiments, a predetermined location in memory 62 may store a value which is incremented or decremented to show the number of times that passkey 52 has been used to reprogram a vehicle or the number of uses left in passkey 52 to reprogram a vehicle, respectively. In various embodiments, programming steps to implement passkey 52 can be stored or executed on one or a combination of passkey 52 and controller 24.

In various embodiments, memory 62 may have a different location which holds a predetermined, programmed value defining the maximum number of uses of passkey 52. The predetermined value may be set at manufacture or, in various embodiments, could be changed by a dealer or a manufacturer. After the predetermined number of vehicles have been modified using passkey 52, passkey 52 may be inoperative for any other vehicles.

In various other embodiments, electronic passkey 52 includes memory 62 to which multiple vehicle serial numbers may be written. For example, passkey 52 may be configured to enable golf car or small utility vehicle dealers to program up to a predetermined number of vehicles, such as twenty. In various embodiments, passkey 52 may be operative for vehicles whose controllers 24 have been previously modified by the same passkey 52. In other embodiments, passkey 52 may be rejected for other than the predetermined number of vehicles, and may be used to modify each vehicle only one time. In various other embodiments, passkey 52 or controller 24 may be configured so that passkey 52 modifies the controllers 24 of a predetermined number of vehicles, and a given vehicle having a serial number already written to memory 62 of passkey 52 can then be modified again so long as less than the predetermined number of vehicles has been modified. In other words, according to various embodiments, memory can store multiple, identical serial numbers. In various embodiments, controller 24 queries passkey 52 to determine if it has been used previously. Controller 24 writes the vehicle serial number into memory 62 of passkey 52. In various embodiments, controller 64 determines if passkey 52 has been used. Controller 64 can query controller 24 for a vehicle serial number or other identifier and writes the information to memory 62.

FIG. 4 shows a transition table for example vehicle profiles, modes enabled by passkey 52, and the state of passkey 52. For each case, a vehicle can assume one of five, predetermined profiles. Also for each case, passkey 52 can enable a predetermined mode, Mode N, for example. In Case I, a vehicle may be in any of profiles 1-4 in an initial or current state. An initial or current state is the state of the vehicle prior to connection of passkey 52 to external port 54 and modification of controller 24. In Case I, the vehicle Mode N has not been activated (OFF) and the passkey 52 is NEW, i.e, the passkey has not been used, the vehicle profile is changed to profile 5, the vehicle Mode N is turned ON, and the passkey 52 state is changed to USED. An audible tone set of three beeps at 2 Hz indicates Case I. In Case II, if the vehicle is in any of profiles 1-4, Mode N is OFF, and the passkey 52 state is USED, the profile is unchanged, Mode N remains OFF, and the passkey 52 state remains USED. An audible tone of 2 seconds indicates Case II. In Case III, if the vehicle is already in profile 5, Mode N is ON, and passkey 52 state is NEW, the vehicle remains in profile 5, Mode N remains ON, passkey 52 remains NEW. An audible tone of six beeps at 4 Hz indicates this condition. In Case IV, if the vehicle is in profile 5, Mode N is ON, and passkey 52 state is USED, the profile remains 5, Mode N remains ON, and passkey 52 state remains USED. An audible tone of one beep for two seconds indicates Case IV. In Case V, if the vehicle is in any of profiles 1-4, Mode N is ON, and passkey 52 state is NEW, the vehicle profile changes to 5, Mode N remains ON, and the passkey 52 state changes to USED. An audible tones having three beeps at 2 Hz indicates this condition. In case VI, if the vehicle is in profile 1-4, Mode N is ON, and passkey 52 state is USED, the vehicle profile remains the same, Mode N remains ON, passkey 52 state remains USED. An audible tone consisting of one continuous beep for two seconds indicates this case.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle control system, comprising:
a control module, the control module controlling a vehicle in accordance with at least one parameter of vehicle operation;
an external port, the external port electrically communicating with the control module;
a parameter control device having memory configured to store information indicative of a number of uses left in the parameter control device, the parameter control device being selectively connected to the external port to enable electrical communication between the control module and the parameter control device;
wherein the parameter control device and control module cooperate to modify the at least one parameter, the parameter control device having a predetermined limitation encoded therein on the number of control modules for which it can modify the at least one parameter, the memory of the parameter control device is configured to change the information in the memory in response to the control module having been modified, and the parameter control device and the control module are configured to cooperate to modify the at least one parameter upon connection to the external port in response to the vehicle control module being in a predetermined mode.

2. The vehicle control system of claim 1, wherein the parameter control device is configured to enable modifying the at least one parameter for a single vehicle.

3. The vehicle control system of claim 2, wherein the parameter control device is configured to enable modifying the at least one parameter for the single vehicle only once and thereafter is configured to be disabled from again enabling modifying the at least one parameter of the single vehicle.

4. The vehicle control system of claim 1, wherein the parameter control device is configured to enable modifying the at least one parameter for a plurality of vehicles.

5. The vehicle control system of claim 4, wherein the parameter control device is configured to enable modifying the at least one parameter for each of the plurality of vehicles only once and thereafter configured to be disabled from again enabling modifying the at least one parameter of the plurality of vehicles.

6. The vehicle control system of claim 1, wherein the parameter control device is configured to enable modifying the at least one parameter for a single vehicle a second time once the parameter control device has enabled modifying the at least one parameter for the single vehicle at first time.

7. The vehicle control system of claim 6, wherein the parameter control device is configured to enable modifying the at least one parameter for the single vehicle once paired with the single vehicle.

8. The vehicle control system of claim 1 wherein the at least one parameter comprises at least one of an upper speed limit, an acceleration profile, a deceleration profile, or a braking profile.

9. A parameter key for a vehicle, comprising:
memory configured to store information indicative of a number of uses left in the parameter key, and data;
an interface to a vehicle controller, the parameter key is configured to communicate the data stored in the memory to the vehicle controller upon electrical communication between the parameter key and the vehicle controller;
wherein the memory is configured to store identifier information associated with the vehicle and the vehicle controller is configured to modify a vehicle parameter of the vehicle controller in accordance with the identifier information, the parameter key having a predetermined limitation encoded therein on the number of controllers for which it can modify the vehicle parameter, and the parameter key is configured to change the information indicative of the number of uses left in the parameter key or the identifier information in the memory in response to the vehicle parameter having been modified.

10. The parameter key of claim 9, wherein the parameter key is encoded to enable modifying a single vehicle.

11. The parameter key of claim 10, wherein the parameter key is configured to be encoded to enable modifying a single vehicle only once and is thereafter disabled from again modifying the single vehicle.

12. The parameter key of claim 9, wherein the parameter key is configured to be encoded to enable modifying a plurality of vehicles.

13. The parameter key of claim 12, wherein the parameter key is configured to be encoded to enable modifying the plurality of vehicles only once and is thereafter configured to be disabled from again modifying the at least any of the plurality of vehicles.

14. The parameter key of claim 9, wherein the parameter key is configured to be encoded to enable modifying the at least one parameter for a single vehicle a second time once the parameter key has enabled modifying the at least one parameter for the single vehicle.

15. The parameter key of claim 14, wherein the parameter key is configured to be encoded to enable modifying the at least one parameter for the single vehicle once paired with the single vehicle.

16. The parameter key of claim 9 wherein the at least one parameter comprises at least one of an upper speed limit, an acceleration profile, a deceleration profile, or a braking profile.

17. A parameter key for a vehicle having a prime mover, the prime mover causing displacement of the vehicle when actuated, a braking system, the braking system reducing a speed of the vehicle when actuated, a control module, the control module controlling at least one parameter of the prime mover or the braking system, and an external port, the external port providing electrical communication with the control module, the parameter key comprising:
a parameter key port, the parameter key port is configured to be selectively connected to the external port to enable electrical communication between the parameter key and the control module; and
memory configured to store key port usage information indicative of a number of uses left in the parameter key wherein the parameter key is configured to cooperate with the control module to modify the at least one parameter, the parameter key is configured to enable a predetermined modification of the at least one parameter, and wherein the parameter key is configured to communicate with the control module to enable the predetermined modification upon connection to the external port when the vehicle control module is in a predetermined mode, and wherein the key port usage information in the memory is configured to be modified in response to the parameter key port communicating with the control module.

* * * * *